United States Patent [19]
Bachelard et al.

[11] Patent Number: 5,612,267
[45] Date of Patent: Mar. 18, 1997

[54] CERAMIC PREFORMS COMPRISING MONOCRYSTALLINE HEXAGONAL PLATELETS OF α-ALUMINA

[75] Inventors: Roland Bachelard, Lyon; Annick Faure, Venissieux, both of France

[73] Assignee: Atochem, Puteaux, France

[21] Appl. No.: 465,616

[22] Filed: Jun. 5, 1995

Related U.S. Application Data

[63] Continuation of Ser. No. 335,953, Nov. 3, 1994, abandoned, which is a continuation of Ser. No. 71,038, Jun. 2, 1993, abandoned, which is a continuation of Ser. No. 915,757, Jul. 21, 1992, abandoned, which is a continuation of Ser. No. 704,368, May 23, 1991, abandoned.

[30] Foreign Application Priority Data

May 23, 1990 [FR] France .................................. 90 06448

[51] Int. Cl.$^6$ ........................................... C04B 35/10
[52] U.S. Cl. ........................................ 501/127; 501/153
[58] Field of Search ..................................... 501/127, 153

[56] References Cited

U.S. PATENT DOCUMENTS

| | | | |
|---|---|---|---|
| 3,915,662 | 10/1975 | Labelle et al. ........................ | 156/608 |
| 4,125,406 | 11/1978 | Sowman ................................ | 501/105 |
| 4,130,402 | 12/1978 | Schepers et al. ..................... | 423/625 |
| 4,308,088 | 12/1981 | Cherdron et al. ..................... | 156/603 |
| 4,374,119 | 2/1983 | Schepers et al. ..................... | 423/625 |
| 4,379,134 | 4/1983 | Weber et al. ......................... | 423/626 |
| 4,390,508 | 6/1983 | Watanabe et al. ..................... | 423/625 |
| 4,477,427 | 10/1984 | Matyasi et al. ....................... | 423/628 |
| 4,822,592 | 4/1989 | Miska ................................. | 501/153 |
| 4,881,951 | 11/1989 | Wood et al. .......................... | 51/293 |
| 4,983,556 | 1/1991 | Seike et al. .......................... | 501/143 |
| 4,994,588 | 2/1991 | Kapicak .............................. | 549/534 |
| 4,994,589 | 2/1991 | Notermann . | |
| 4,996,177 | 2/1991 | Takagi et al. ........................ | 501/127 |
| 5,017,524 | 5/1991 | Moskowitz et al. .................... | 501/127 |

*Primary Examiner*—Paul Marcantoni
*Attorney, Agent, or Firm*—Burns, Doane, Swecker & Mathis, L.L.P.

[57] ABSTRACT

Ceramic preforms comprising monocrystalline hexagonal platelets of α-alumina, well adopted for conversion into refractory bricks or ceramic composites, are prepared by crystallizing a settled fine powder of amorphous alumina, transition alumina or alumina hydrate, advantageously in the presence of a fluoro-compound flux, into a coherent mass of such hexagonal platelets of α-alumina.

18 Claims, 9 Drawing Sheets

CERAMIC PREFORMS COMPRISING MONOCRYSTALLINE HEXAGONAL PLATELETS OF α-ALUMINA

This application is a continuation of application Ser. No. 08/335,953, filed Nov. 3, 1994 (now abandoned), which is a continuation of application Ser. No. 08/071,038, filed Jun. 2, 1993 (now abandoned), which is a continuation of application Ser. No. 07/915,757, filed Jul. 21, 1992 (now abandoned), which is a continuation of application Ser. No. 07/704,368, filed May 23, 1991 (now abandoned).

BACKGROUND OF THE INVENTION

1. Field of the Invention

The present invention relates to ceramic preforms, to a process for the preparation thereof and to the use of such preforms, in particular, for the production of metal or ceramic composite shaped articles.

2. Description of the prior Art

The production of metal composites is known to this art. Compare the process described in EP-A-0,328,805, according to which a metal in the molten state is introduced into a cavity, a preform is placed on the molten metal and, under the influence of pressure applied to the preform, the molten metal impregnates into said preform. According to this patent, the preform consists of a refractory fibrous material such as alumina, zirconium dioxide, silica, silicon carbide, silicon nitride or titanium diboride in the form of chopped fibers.

EP-A-0,337,732 describes the production of metal composites reinforced with B-type silicon nitride whiskers. This process entails impregnating the whiskers with molten metal and solidifying the latter to provide a metal composite reinforced by such whiskers. The whiskers are themselves obtained by high-temperature calcination of an amorphous or α-type silicon nitride powder. It is in the form of fibers having a diameter of 0.1 to 5 μm and a length of 2 to 100 μm.

Japanese Application 1,180,929 describes the preparation of preforms for aluminum-based composites by compression of short fibers of alumina, silica, silicon nitride, silicon carbide, glass or carbon, to which a lubricant such as graphite, $MoS_2$, $WS_2$, Sn, Pb, alumina cement, gypsum or fluorite, a resinous binder and a solvent have been added.

Japanese Application 1,157,803 describes the preparation of preforms by mixing a fine inorganic powder (aluminum oxide, silicon carbide, silicate, titanium dioxide, zirconium oxide, silicon nitride, boron carbide or boron nitride) with a binder selected from among water-soluble resins, malaxating the entire mass, and introducing it into a mold previously lined with a sheet of polyvinyl acetal and this assembly is heated to solidify and integrate the acetal sheet on the surface of the preform.

Japanese Application 1,225,732 also describes the impregnation of short fibers (for example $Al_2O_3$) using a metal matrix. These preforms contain up to 10% of an inorganic binder and up to 5% of silica particles.

Japanese Application 87-139,838 describes the production of metal composites containing silicon carbide whiskers of precise and uniform shape.

Japanese Application 87-299,569 describes the production of metal composites (Al) from a preform of inorganic fibers. These fibers are used in the form of a felt obtained by immersion of woven SiC, $Si_3N_4$, $Al_2O_3$, C and/or metal fibers in a bath agitated by ultrasound and containing ceramic, carbon and/or metal short fibers, whiskers and/or powders.

It will thus be seen that the known preforms are essentially comprised of fibrous materials or whiskers or powder of a metal oxide, carbide or nitride, and consolidated by means of a water-soluble resin of the polyvinyl acetate, cellulose acetate or polyvinyl alcohol type, or starch.

SUMMARY OF THE INVENTION

Accordingly, a major object of the present invention is the provision of novel ceramic preforms, such novel preforms comprising monocrystals of α-alumina in the form of hexagonal platelets thereof.

DETAILED DESCRIPTION OF THE PREFERRED EMBODIMENTS OF THE INVENTION

Figure 1:
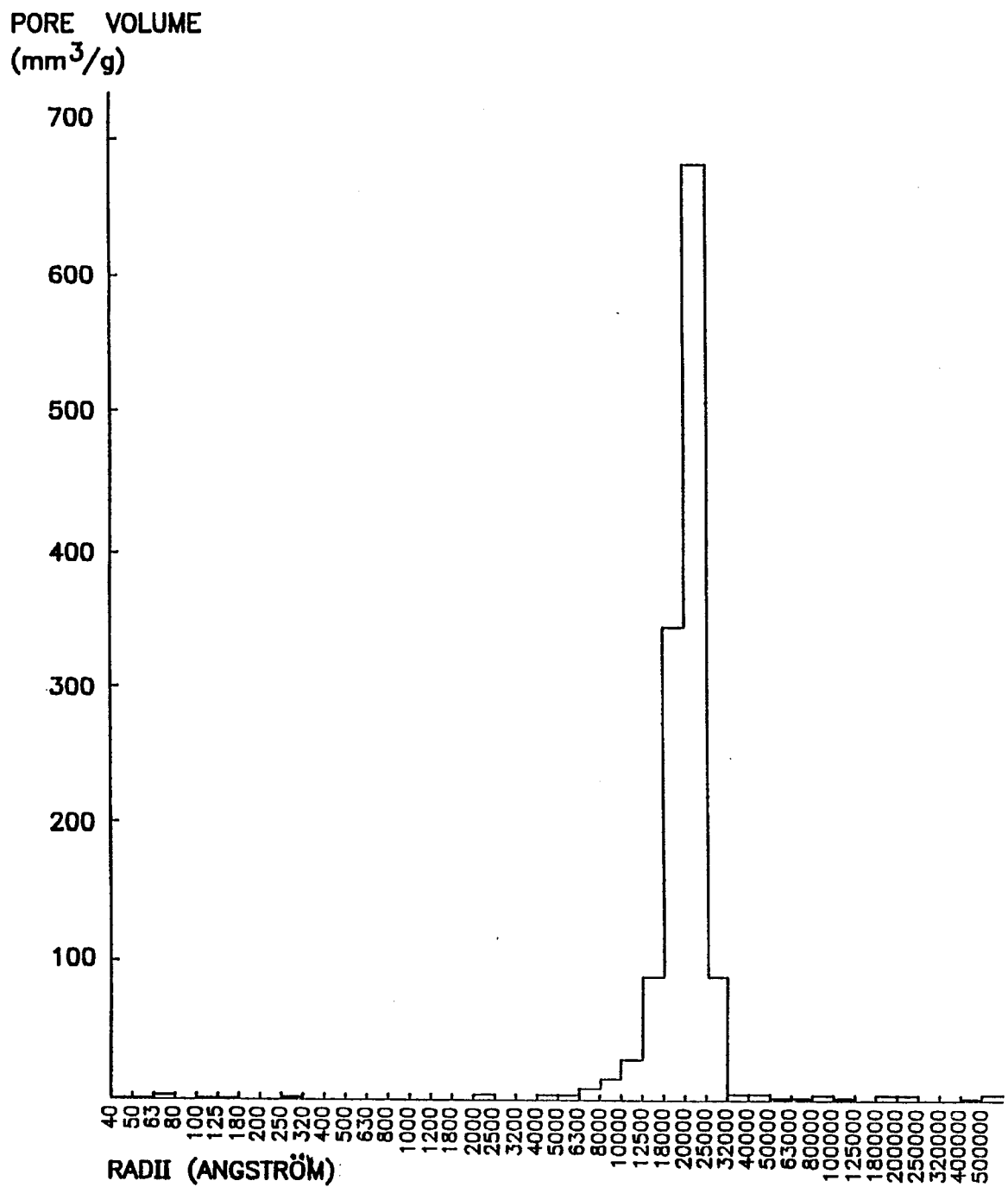
FIG. 1 is a bar graph of the pore volumes of the preform made in Example 1.

More particularly according to the present invention, the subject ceramic preforms advantageously essentially consist of hexagonal platelets of α-alumina, or are mixed preforms in which said platelets are combined with one or more other reinforcing materials, such as ceramic whiskers, short fibers or fine particles, and these materials may be selected from among the materials described in the above patents and published patent applications, the α-alumina content preferably remaining predominant.

In the preforms essentially consisting of hexagonal platelets of α-alumina, the content of the latter is advantageously at least 90% by weight.

This invention also features preforms essentially consisting of hexagonal platelets in which the pore structure is homogeneous and, more particularly, preforms in which the pore radius distribution is such that $\sigma^2 = R\ 84/R\ 16 \leq 3$, where:

R 84 represents the pore radius for 84% of the cumulative pore volume,

R 16 represents the pore radius for 16% of the cumulative pore volume, with $R\ 84/R\ 50 = \sigma$, $\sigma$ being the standard deviation of the pore radius distribution.

The invention also features such preforms in which the porosity is at least 70% and essentially all pores have a radius of more than 0.1 µm.

The invention also features such preforms which are stable at temperatures above 1,500° C.

Herein, the porosity is determined using a mercury porosimeter or calculated from the determination of the apparent density of the preform given the absolute density of the material. The pore volume distribution as a function of the pore radii is determined using a mercury porosimeter.

In the preforms according to the invention, the monocrystalline hexagonal platelets essentially consist of macrocrystals preferably having a diameter ranging from 2 to 50 µm, a thickness ranging from 0.1 to 2 µm and a diameter/thickness ratio ranging from 5 to 100.

Amongst such macrocrystals, the platelets having a diameter ranging from 2 to 18 µm, a thickness ranging from 0.1 to 1 µm and a diameter/thickness ratio ranging from 5 to 40 are particularly preferred.

This invention also features a process for the production of such preforms, comprising crystallizing a settled fine powder of amorphous alumina, transition alumina or alumina hydrate into a coherent mass of hexagonal platelets of α-alumina, if necessary in the presence of a reinforcing material.

By the term "settled powder" is intended a powder settled in a vessel until no further reduction in volume is observed (in accordance with the standard NF ISO 3953).

According to this process, the crystallization into hexagonal platelets is carried out in the presence of a flux containing chemically bonded fluorine, in the molten state, and being a solvent for the alumina used.

By the term "transition alumina or alumina hydrate" is intended all forms of aluminum oxide or aluminum hydroxide, which may be hydrated, with the exception of α-alumina.

The flux, also designated a mineralizing agent, has the characteristics defined above, and essentially consists of one or more non-hydrolyzable fluorine-containing compound(s), or of a system comprising a phase of said non-hydrolyzable fluorine-containing compound(s) and a phase of a hydrolyzable fluorine-containing compound, one of the phases being dissolved in the other phase.

Exemplary of the aforementioned fluxes, the following are particularly representative: the systems comprising aluminum trifluoride and one or more alkali metal fluoride(s) or alkaline earth metal fluoride(s), and especially lithium, sodium, potassium or calcium fluorides. More preferably, the flux comprises the system $AlF_3$-$LiF$ in the form $Li_3AlF_6$ (lithium cryolite), $Na_3AlFR_6$ (sodium cryolite), $K_3AlF_6$ (potassium cryolite) or $Li_3Na_3\ (AlF_6)_2$ (cryolithionite) or 3 $AlF_3$, 5 LiF (lithium chiolite).

The fluxes according to the invention are advantageously in the form of a powder, the particle size of which is preferably less than 1 mm (for at least 50% by weight of the particulates).

In carrying out the process according to the invention, at least 2% and preferably 4% to 20% by weight of flux are used relative to the weight of alumina employed.

In the process according to the invention, the mixture of starting alumina and flux is carefully settled in a mold, is heated, if necessary in an inert atmosphere (nitrogen for example), to a temperature above the melting point of the flux and, preferably, to a temperature ranging from 900° to 1,200° C., and is maintained at this temperature until the starting alumina has been converted into α-alumina (corundum). In general, this conversion is attained within a period of time which may range, for example, from a few minutes to a few hours.

In one embodiment of the process according to the invention, and in particular when it is desired to prepare platelets having a diameter and/or thickness close to the higher values indicated above, the starting material alumina may be combined with hexagonal platelets of α-alumina prepared previously.

In another embodiment of the process according to the invention, the preform can be prepared from hexagonal platelets of α-alumina without alumina powder but, if necessary, in the presence of a reinforcing material.

Transition of alumina hydrate may be selected within a wide range of powders of various diameters and specific surface areas. Very particularly preferred are the aluminas in which at least 50% by weight of the particulates have a diameter smaller than 50 µm, preferably smaller than 25 µm, and more preferably smaller than 1.5 µm. Among such aluminas, preferred are those having a specific surface area equal to or greater than 100 m²/g (measured by the BET method) and preferably ranging from 100 to 400 m²/g.

The alumina and the flux may be employed either in the form of a dry mixture (powders) or in the form of alumina impregnated with an aqueous solution of the flux, if necessary in the presence of a solubilizing agent ($AlCl_3$ for example).

After cooling and release from the mold, the porous mass obtained may be shaped by cutting, abrasion or any other operation shaping of the mass to the desired shape and dimensions.

In a preferred embodiment of the invention, to increase the mechanical strength of the preforms, a complementary heat treatment may be carried out upon completion of the crystallization. This treatment is preferably carried out at a temperature higher than the crystallization temperature. This high-temperature treatment enables the flux and/or the products derived from the said flux to be removed.

The process according to the invention is very easy to carry out, such ease of implementation being associated, in particular, with the fact that the subject process may be carried out dry.

The preforms according to the invention may, by virtue of their refractory properties, themselves constitute lightweight bricks which can be used for high-temperature thermal insulation.

They may also, by virtue of their constituent material and by virtue of their high porosity, by converted into composites by impregnation of same with a molten metal or alloy and, in particular, with molten aluminum or an aluminum alloy.

In order to further illustrate the present invention and the advantages thereof, the following specific examples are given, it being understood that same are intended only as illustrative and in nowise limitative.

EXAMPLE 1

An alumina powder and the flux $Li_3AlF_6$, in an amount of 5% by weight relative to the weight of the alumina, were intimately admixed at ambient temperature.

The alumina employed was a gamma-alumina having a specific surface area of 172 m²/g and was such that 50% by weight of the constituent grains had a diameter smaller than 1.1 µm; the flux was such that 50% by weight of the constituent grams had a diameter smaller than 0.9 µm (the melting point of this material was 776° C.).

The mixture was placed in a crucible and settled manually until a density of about 0.65 was attained. The crucible was introduced into a furnace in an air atmosphere. The temperature of the furnace was increased to 980° C. over the course of one hour and then maintained at this temperature for one hour. Cooling was carried out in the ambient air.

Figure 6:
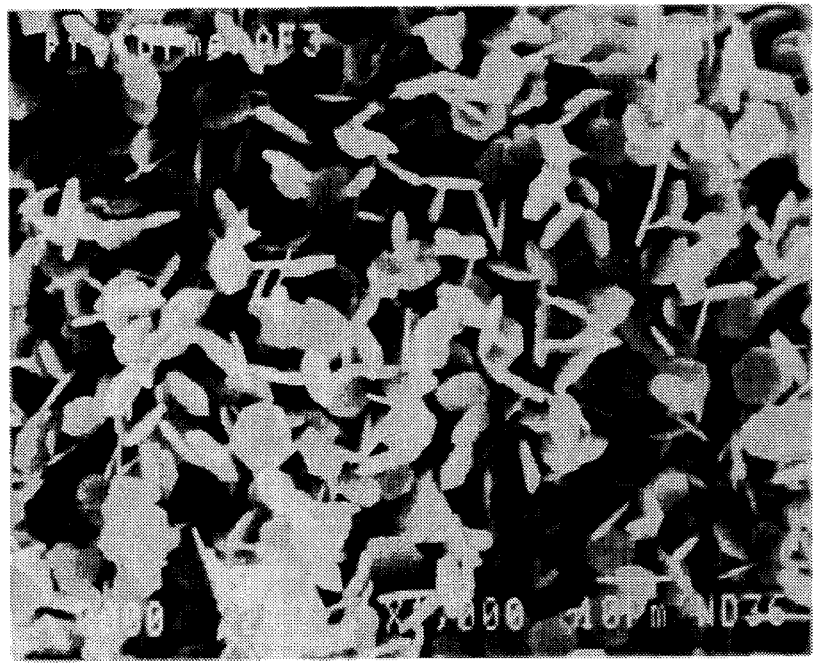
FIG. 6 is a photomicrograph of the preform made in Example 1.

The product obtained was a preform which easily released from the mold and comprised platelets having an average diameter d of 7 µm and an average thickness e of 0.5 µm. It had a density of 0.63 and a pore volume of 1.318 cm³/g. The pore distribution defined as the category of pores representing the largest pore volume is the category delimited by the radii $R_1=2$ µm and $R_2=2.5$ µm. FIG. 1 is a bar graph of the pore volumes of this preform and FIG. 6 is a microphotograph of such preform (magnification =1,000×).

EXAMPLE 2

An identical mixture as that of Example 1 was first subjected to settling, at a pressure of $10^7$ Pa. It was then placed in the furnace in this form, the use of a crucible not being necessary in this case. Firing was identical to that in Example 1.

EXAMPLE 3

Figure 2:
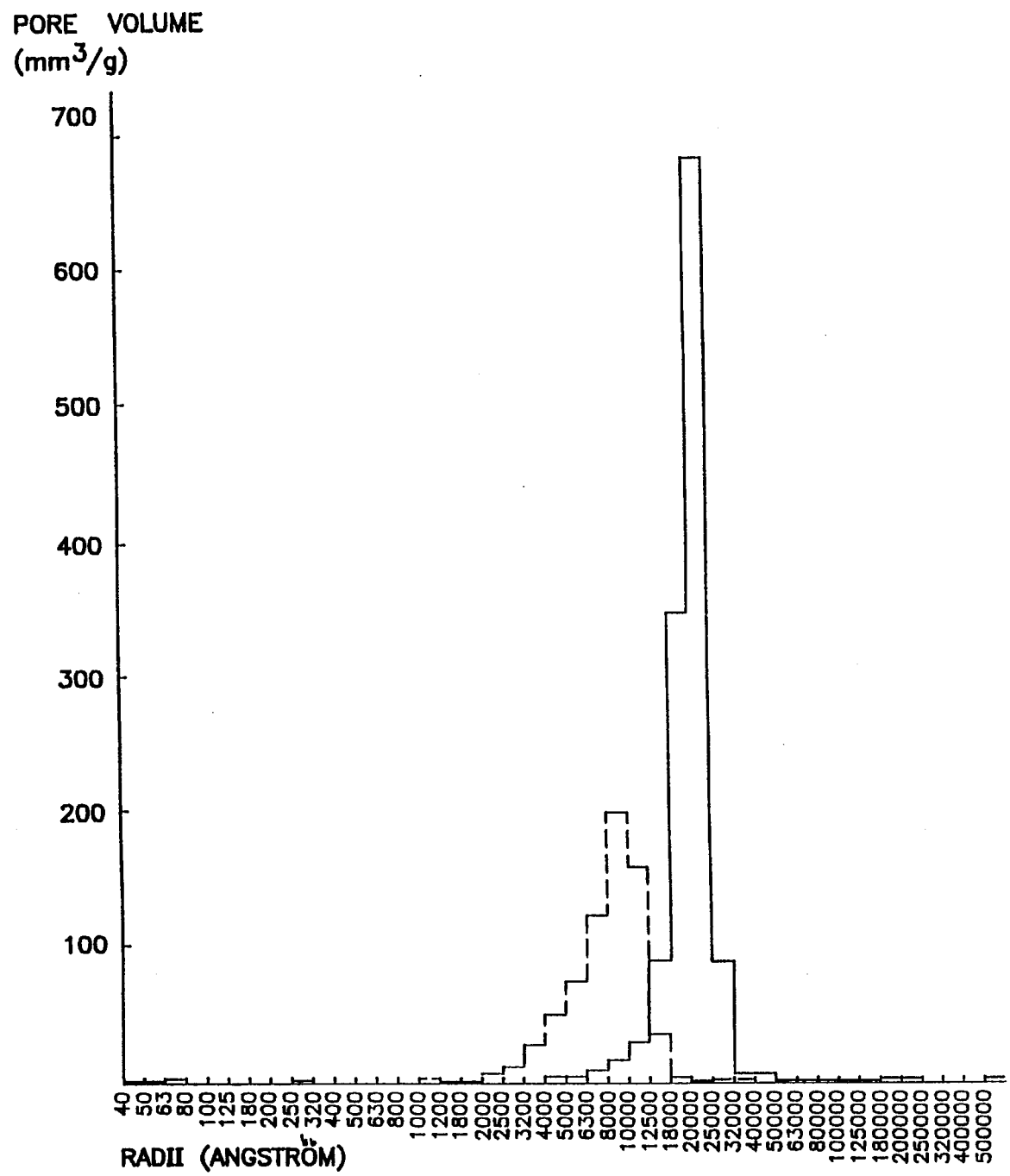
FIG. 2 is a bar graph of the pore volumes of the preforms made in Examples 1 (continuous lines) and 3 (dotted lines).
Figure 7:
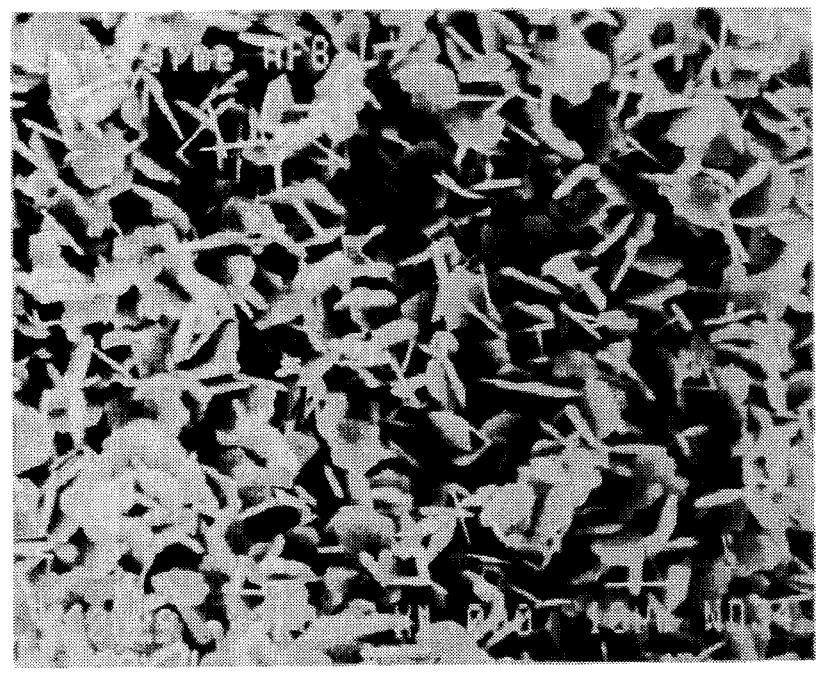
FIG. 7 is a photomicrograph of the preform made in Example 3.

The procedure of Example 2 was repeated, but the pre-settling was carried out under a pressure of $5\times10^7$ Pa. FIG. 2 is a bar graph of the pore volumes (dotted lines), includes the bar graph of Example 1 (continuous lines), and FIG. 7 is a microphotograph of this preform (magnification =1,000×).

EXAMPLE 4

The procedure of Example 3 was repeated, but with a pre-settling under $10^8$ Pa.

EXAMPLE 5

Figure 3:
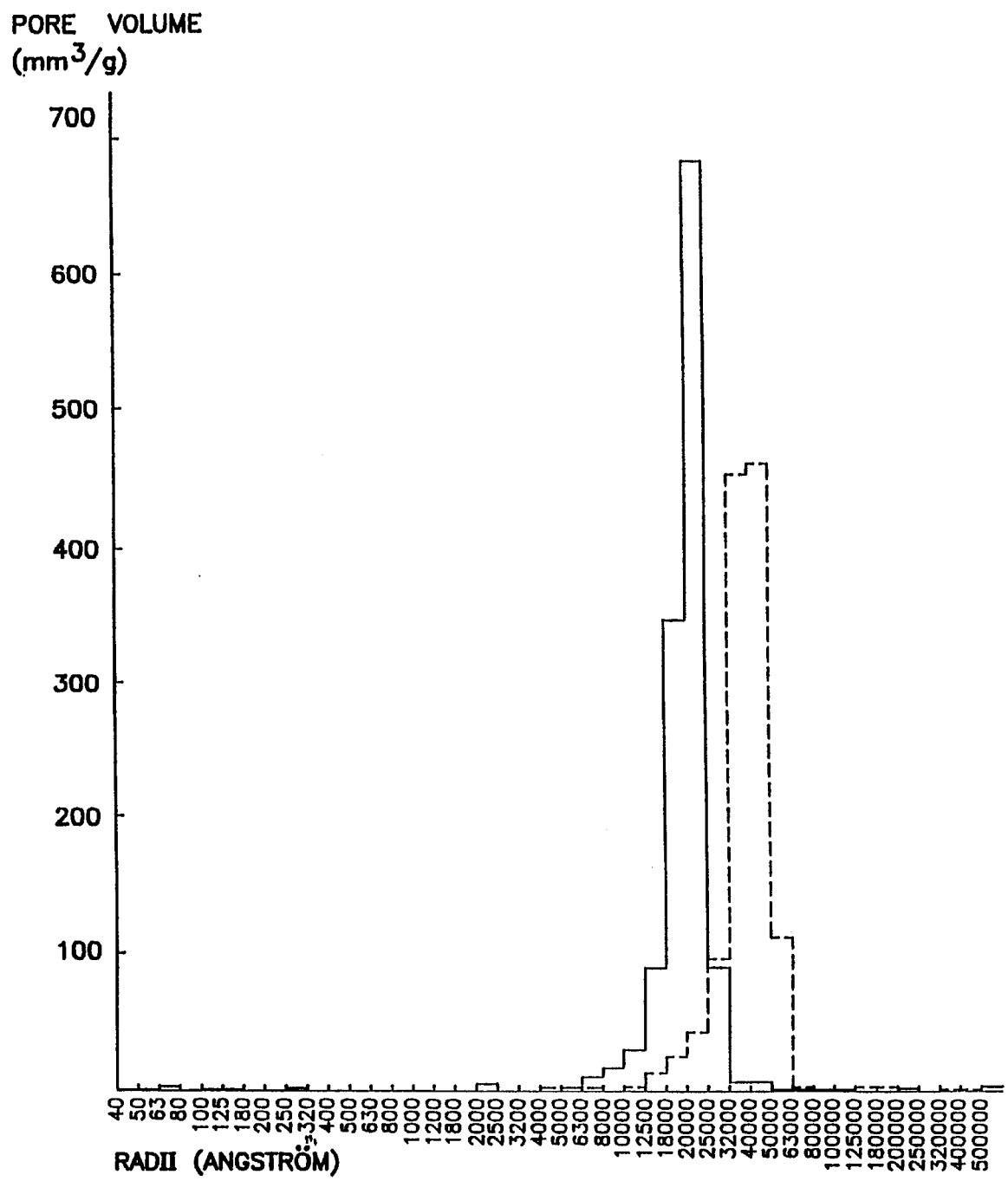
FIG. 3 is a bar graph of the pore volumes of the preforms made in Examples 1 (continuous lines) and 5 (dotted lines).
Figure 8:
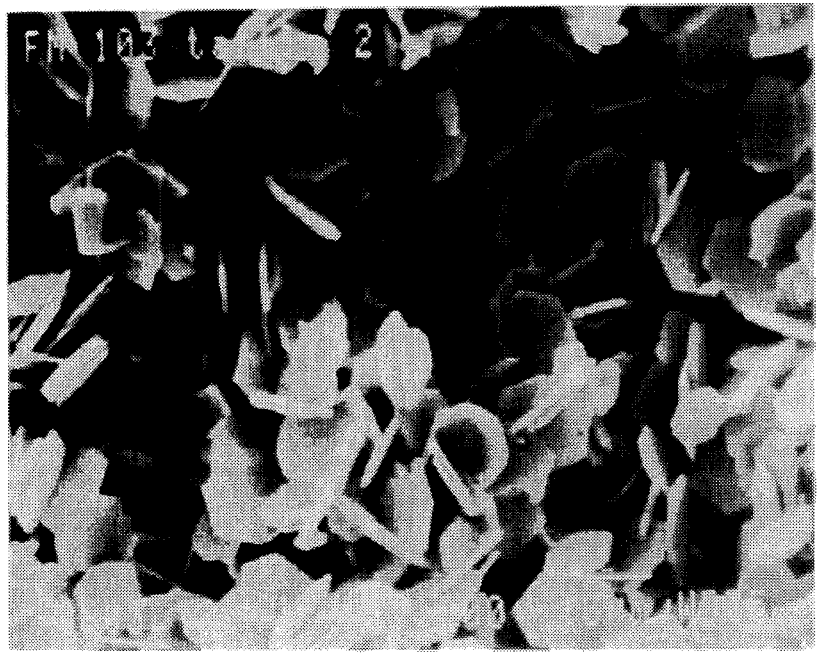
FIG. 8 is a photomicrograph of the preform made in Example 5.

Platelets obtained by deagglomeration of the preform produced Example 1 were added to the mixture described in Example 1, in an amount of 50% of the weight of said mixture. Settling was identical to that in Example 1, as were the firing conditions. FIG. 3 is a bar graph of the pore volumes of the preform (dotted lines), and includes the bar graph of Example 1 (continuous lines). FIG. 8 is a microphotograph showing the macrocrystals of this preform.

EXAMPLE 6

Figure 9:
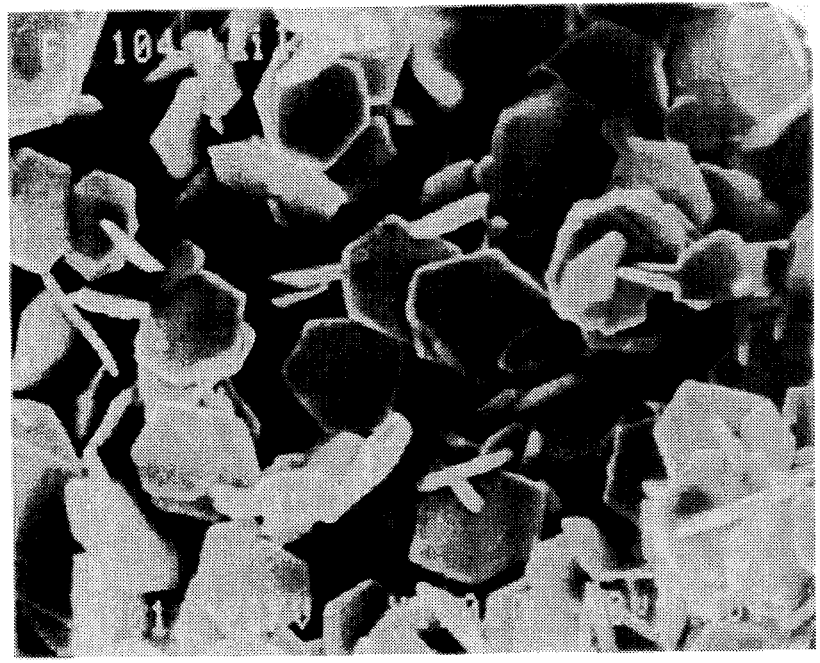
FIG. 9 is a photomicrograph of the preform made in Example 6.

Platelets obtained by deagglomeration of the preform produced in example 5 were added to the mixture described in Example 1, in an amount of 50% of the weight of said mixture. All other conditions were identical to those in Example 1. FIG. 9 is a microphotograph showing the macrocrystals of this preform.

EXAMPLE 7

Figure 4:
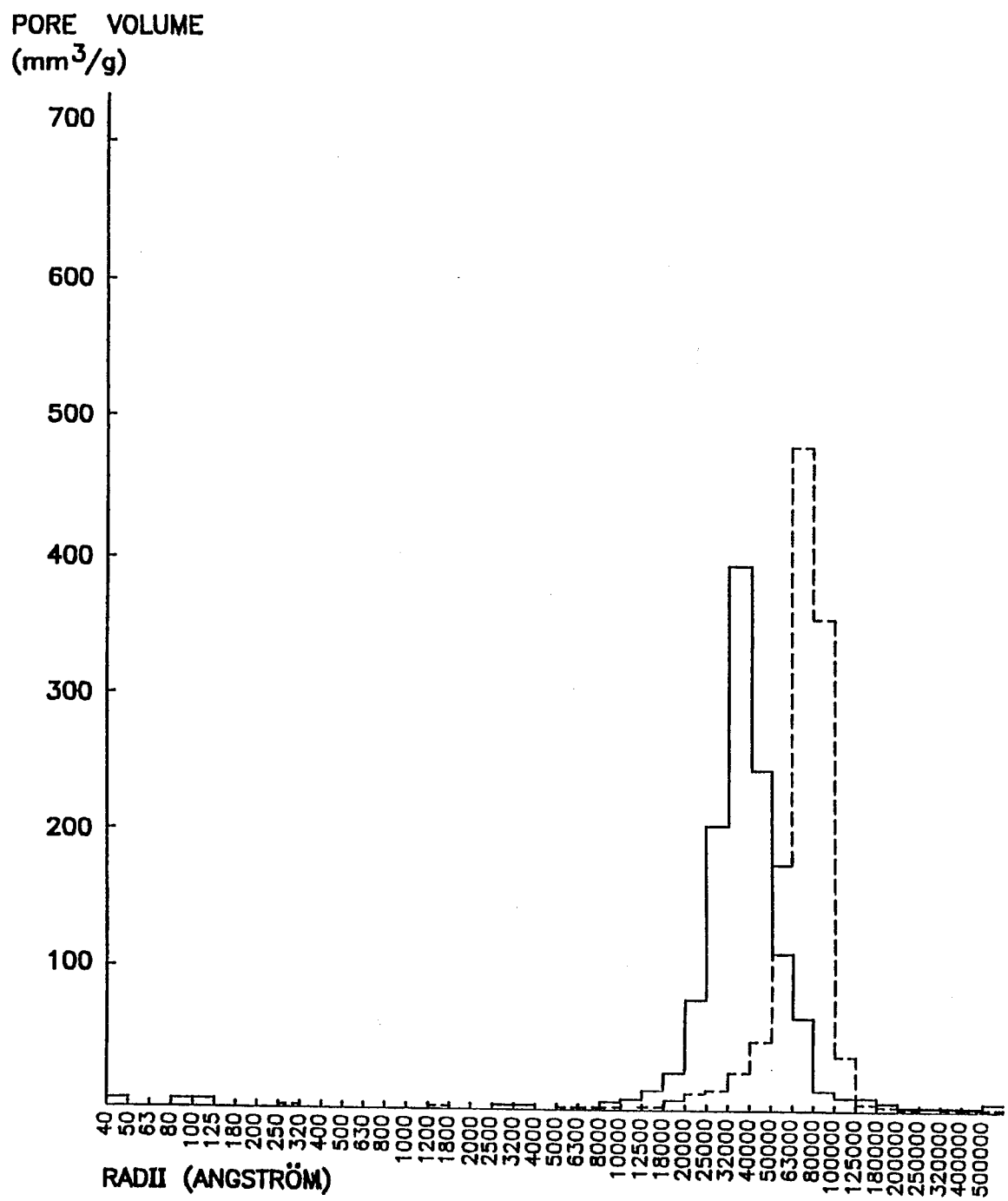
FIG. 4 is a bar graph of the pore volumes of the preforms made in Examples 6 (continuous lines) and 7 (dotted lines).
Figure 10:
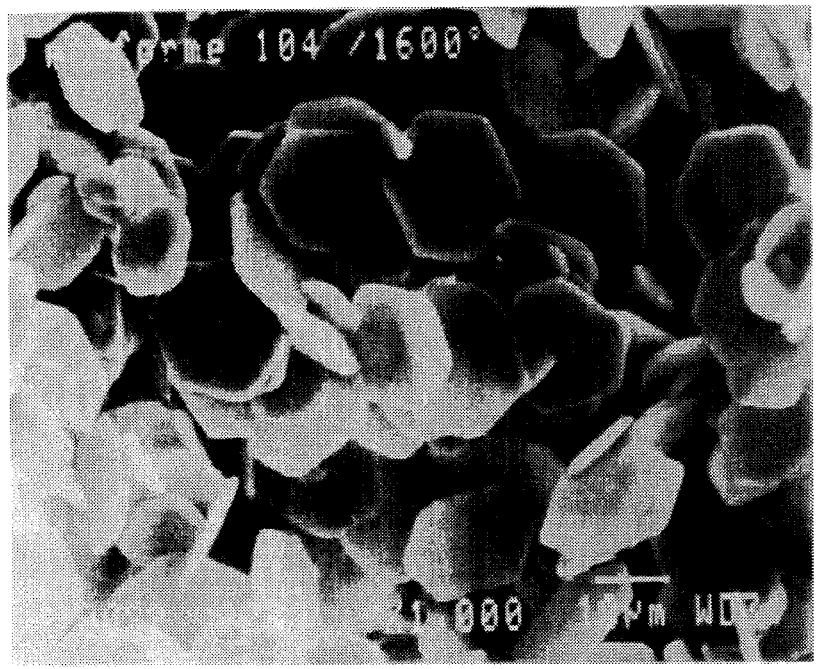
FIG. 10 is a photomicrograph of the preform made in Example 7.

The preform of Example 6 was heated to 1,600° C. for 3 hours. FIG. 4 is a bar graph of the pore volumes of the preforms of Example 6 (continuous lines) and of Example 7 (dotted lines). FIG. 10 is a microphotograph of such preform.

EXAMPLE 8

Figure 5:
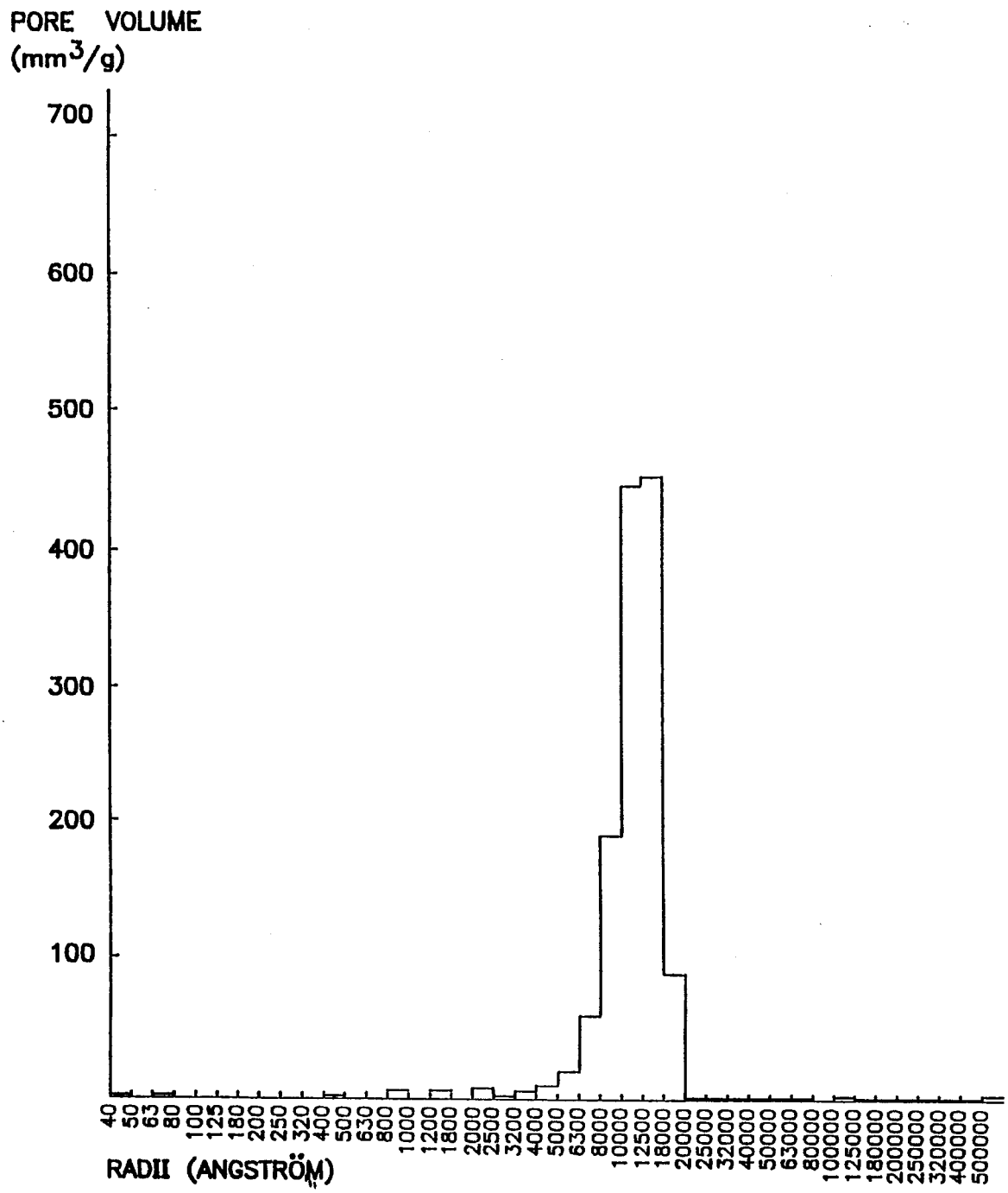
FIG. 5 is a bar graph of the pore volumes of the preform made in Example 8.
Figure 11:
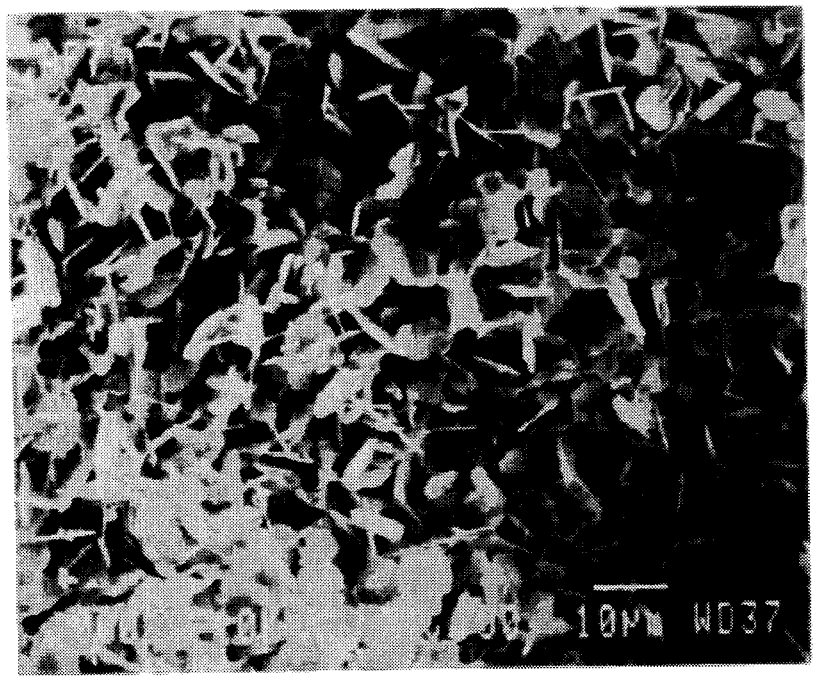
FIG. 11 is a photomicrograph of the preform made in Example 8.
Figure 12:
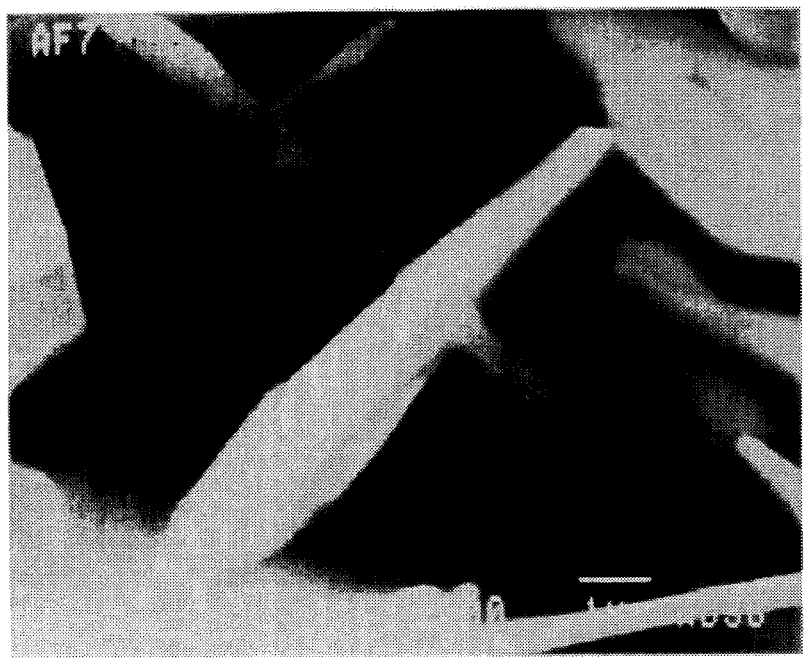
FIG. 12 is a photomicrograph of the preform made in Example 8 showing the formation of a platelet around a whisker.
Figure 13:
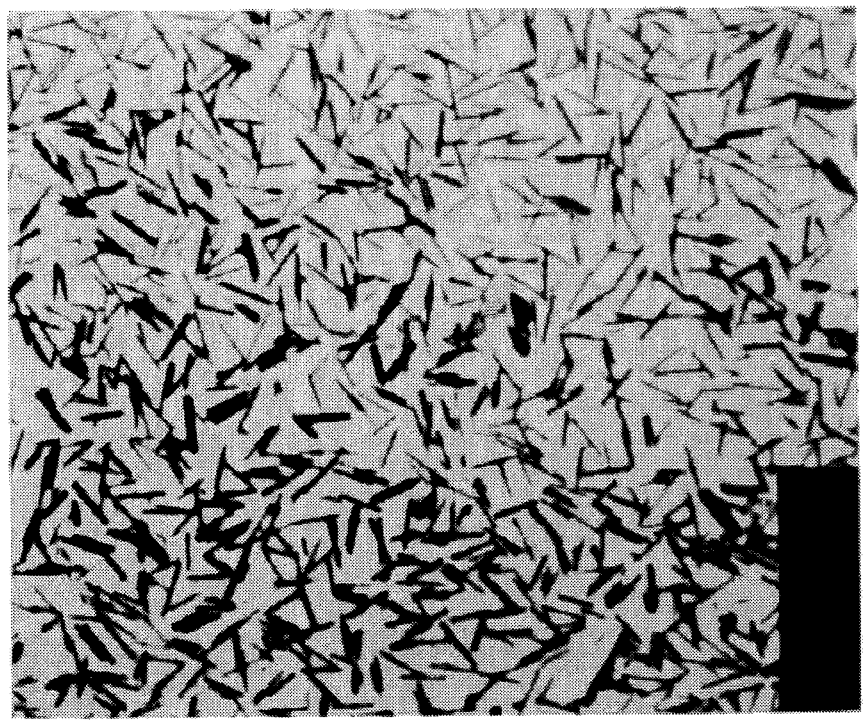
FIG. 13 is a photomicrograph of the preform made in Example 9.

SiC whiskers were added to the mixture described in Example 1, in an amount of 10% of the weight of said mixture. All other conditions were identical. FIG. 5 is a bar graph of the pore volumes of this preform. FIG. 11 is a microphotograph of such preform (magnification=1,000×). FIG. 12 is a microphotograph (magnification=10,000×) showing the formation of a platelet around a whisker.

EXAMPLE 9

The preform of Example 1 was infiltrated/impregnated under the following conditions:

(i) Alloy 6061 (Al/1% Mg/0.5% Si), (ii) Infiltration pressure 100 MPa, (iii) Temperature of the preform 600° C., (iv) Temperature of the alloy 800° C., (v) Forging time, 30 second.

The Vickers hardness determined for the composite was 130 Hv compared with 40 Hv for the pure alloy. FIG. 12 is a microphotograph showing this impregnated preform (magnification=800×), the black areas corresponding to the macrocrystals of α-alumina and the white areas corresponding to the alloy.

All of the determinations are reported in the following Table:

TABLE

| EXAM-PLE | PLATELET DIMENSIONS | | PREFORM CHARACTERISTICS | | |
| --- | --- | --- | --- | --- | --- |
| | d(µm) | e(µm) | Density | Pore volume (cm³/g) | Mode $R_1$—$R_{22}$ (µm) |
| 1 | 7 | 0.5 | 0.63 | 1.318 | 2–2.5 |
| 2 | 7 | 0.5 | 0.89 | 0.873 | 1.25–1.6 |
| 3 | 7 | 0.5 | 1.04 | 0.709 | 0.8–1.6 |
| 4 | 7 | 0.5 | 1.09 | 0.647 | 0.63–0.8 |
| 5 | 12 | 1 | 0.66 | 1.24 | 3.2–4 |
| 6 | 18 | 1.2 | 0.67 | 1.231 | 3.2–4 |
| 7 | 18 | 1.2 | 0.69 | 1.203 | 6.3–8 |
| 8 | 7 | 0.5 | 0.63 | 1.320 | 1.25–1.6 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A ceramic preform which will withstand molten metal infiltration comprising monocrystalline hexagonal platelets of α-alumina having a porosity of at least 70% and essentially consisting of pores having a radius larger than 0.1 µm.

2. The ceramic preform as defined by claim 1, essentially consisting of said hexagonal platelets of α-alumina.

3. The ceramic preform as defined by claim 1, comprising at least 90% by weight of such α-alumina.

4. The ceramic preform as defined by claim 1, further comprising a reinforcing amount of at least one reinforcing material.

5. The ceramic preform as defined by claim 4, said at least one reinforcing material comprising ceramic whiskers, fibers or fine particles.

6. The ceramic preform as defined by claim 5, comprising a predominant amount by weight of said hexagonal platelets of α-alumina.

7. A ceramic preform which will withstand molten metal infiltration comprising monocrystalline hexagonal platelets of α-alumina, porous in nature and having a pore radius distribution such that $\sigma^2 = R\,84/R\,16 \leq 3$, wherein R 84 is the pore radius of 84% of the cumulative pore volume, R 16 is the pore radius of 16% of the cumulative pore volume, with R 84/R50=G, and G being the standard deviation of the pore radius distribution.

8. The ceramic preform as defined by claim 1, said hexagonal platelets essentially consisting of macrocrystals having a diameter ranging from 2 to 50 μm, a thickness ranging from 0.1 to 2 μm and a diameter/thickness ratio ranging from 5 to 100.

9. A process for the preparation of the ceramic preform as defined by claim 1, comprising crystallizing a settled powder of amorphous alumina, transition alumina or alumina hydrate into a coherent mass of said hexagonal platelets of α-alumina.

10. The process as defined by claim 9, carried out in the presence of a flux which comprises chemically bonded fluorine and which, in the molten state, is a solvent for said alumina.

11. The process as defined by claim 10, said flux comprising at least one non-hydrolyzable fluorine-containing compound, or a system comprising a non-hydrolyzable fluorine-containing compound phase and a hydrolyzable fluorine-containing compound phase, one of said phases being dissolved in the other.

12. The process as defined by claim 10, carried out at a temperature higher than the melting point of the flux.

13. The process as defined by claim 12, carried out at a temperature ranging from 900° to 1,200° C.

14. The process as defined by claim 10, said settled powder further comprising hexagonal platelets of α-alumina.

15. A refractory brick shaped from the ceramic preform as defined by claim 1.

16. A ceramic shaped article comprising the ceramic preform as defined by claim 1.

17. The ceramic preform as defined by claim 1, wherein the preform is porous and the platelets are randomly aligned.

18. The preform as defined in claim 1, said preform being stable at temperatures above 1,500° C.

* * * * *